June 9, 1959 V. J. COOPER 2,890,294

PHASE-AMPLITUDE CHARACTERISTIC CORRECTION CIRCUIT ARRANGEMENTS

Filed Dec. 14, 1955

INVENTOR

VICTOR JAMES COOPER,

BY Baldwin & Wight

ATTORNEYS

United States Patent Office 2,890,294

Patented June 9, 1959

2,890,294

PHASE-AMPLITUDE CHARACTERISTIC CORRECTION CIRCUIT ARRANGEMENTS

Victor James Cooper, Chelmsford, England, assignor to Marconi's Wireless Telegraph Company Limited, London, England, a British company Application December 14, 1955, Serial No. 553,108

Claims priority, application Great Britain October 4, 1955

1 Claim. (Cl. 179—171)

This invention relates to phase-amplitude characteristic correction circuit arrangements, that is to say to arrangements whereby a desired correction of the relationship between the phase and the amplitude of a signal may be obtained.

Although of general application to all cases where it is required to correct the phase-amplitude characteristic of an amplifier or other apparatus, the invention is particularly applicable to, and primarily intended for, color television systems wherein color information is carried on a sub-carrier specially provided therefor.

One of the difficulties met with in the known recently proposed color television systems wherein color information is carried on a sub-carrier, is that if fidelity of color "hue" is to be preserved over the range of amplitudes corresponding to the range of brightness it is necessary that the signal transmission system shall not, as a result of changes in the amplitude, i.e. in the brightness level, introduce more than a few degrees of phase shift of the signal components carrying the color information. In other words, it is a requirement that a given so-called chrominance signal shall remain to within a few degrees of the condition of constant phase for all possible values of brightness. This requirement is extremely difficult to satisfy in practice for conventional signal transmission systems include non-linear impedances and accordingly introduce change of phase with change of amplitude. Although theoretically it is possible to linearize every impedance in a transmission system this would obviously be uneconomical and difficult, especially in the case of the power amplification stages of a transmitter.

The present invention when applied to the solution of this problem enables the designer of the transmission system to use conventional apparatus which will introduce change of phase with change of amplitude and to eliminate the undesired effects of this by preceding the apparatus in question with a phase-amplitude characteristic correction circuit arrangement in accordance with the present invention designed to compensate for the known undesired phase-amplitude characteristics of the said conventional apparatus without introducing any substantial additional amplitude non-linearity.

According to this invention a phase-amplitude characteristic correction circuit arrangement comprises an amplifier valve, an impedance having a predetermined non-linear amplitude characteristic in the anode circuit of said valve, an impedance having a substantially complementary non-linear amplitude characteristic in the cathode return circuit of said valve, means for applying signals to be subjected to phase-amplitude correction to an input grid of said valve and means for taking phase-amplitude corrected signals from the anode of said valve.

Figure 1:
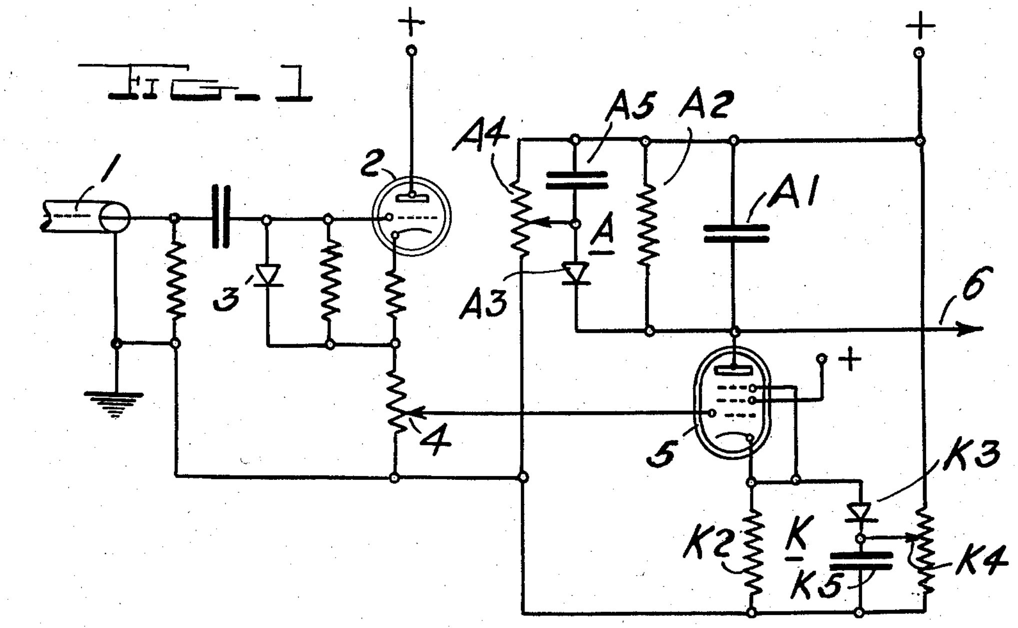
Figure 2:
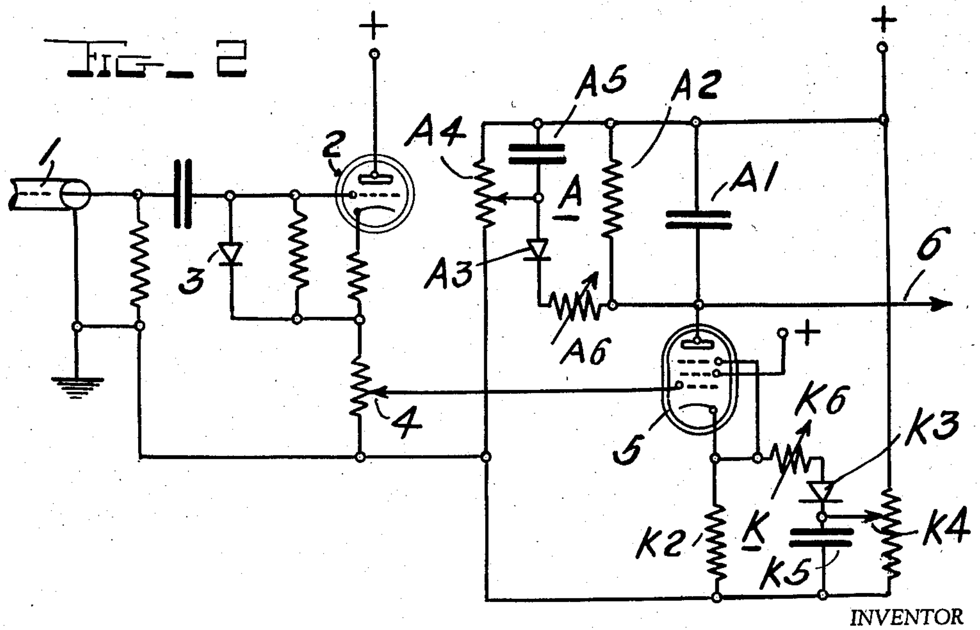

The invention is illustrated in the accompanying drawing in which:

Fig. 1 shows diagrammatically a circuit arrangement of one embodiment thereof; and Fig. 2 shows a circuit arrangement of a modification of the embodiment of Fig. 1.

Referring to Fig. 1 of the drawing signal input, for example the chrominance signals in a color television system of the nature herein before referred to, is applied from an input cable 1 to a cathode follower 2 connected in the usual way and having in its grid circuit a rectifier 3 such as a diode connected as well known per se to provide D.C. restoration. Output from the cathode follower 2, adjusted in amplitude by means of a potentiometer 4, is fed to the control grid of a valve 5 shown as a pentode. This valve has an anode impedance network indicated generally by the letter A and a cathode impedance network represented generally by the letter K. Both these impedance networks have non-linear resistance characteristics chosen to be substantially identical so that, irrespective of the value of the input amplitude applied to the control grid of the valve 5, the output appearing on a lead 6 connected to the anode of the valve 5 is substantially linearly related to the input.

Consider the operation of this circuit arrangement. It may be shown that if the value of a resistance connected in the cathode return circuit of a valve is varied, the frequency and phase response of the valve will not substantially vary but only the gain will vary, whereas if the value of a resistance in the anode circuit is changed there will be changes both in gain and in frequency and phase response due to the presence of capacity A1, the latter including stray capacity across the circuit. This fact is utilized by the present invention by so selecting the non-linear characteristics of the anode and cathode impedances A and K that there is a desired overall phase-amplitude characteristic while a subsantially linear amplitude characteristic is maintained.

To do this the non-linear laws of the impedances A and K are so selected that the ratio $R_A/R_K$ (i.e. the ratio of the resistance of circuit A to the resistance of circuit K) is maintained substantially constant so that changes in gain produced by variations in $R_A$ are compensated for by corresponding changes in $R_K$. If, therefore, the circuits A and K are so designed that $R_A$ and $R_K$ decrease in value with increased input amplitude, such increase of input amplitude will, due to capacity A1 in the anode circuit, produce an advance of the phase in the output without departing from amplitude linearity and, conversely, if $R_A$ and $R_K$ are designed to increase in value with increased amplitude, such increased amplitude will produce a lagging phase effect.

In the drawing the circuit A includes a capacity A1 which may be constituted wholly or in part by the capacity of the lead (not shown) a shunt resistance A2 and a rectifier A3, such as a diode, also effectively connected in shunt end the bias upon which can be adjusted by means of a potentiometer A4. In the circuit the diode A3 is actually in series with a condenser A5 whose impedance, however, is negligibly low compared with that of the biassing potentiometer A4.

The cathode circuit is generally similar except for the absence of a condenser corresponding to condenser A1. It comprises a cathode resistance K2 in effective shunt with which is a rectifier K3, such as a diode, whose bias can be adjusted by means of a potentiometer K4. In series with the diode K3 is a condenser K5 of negligible impedance compared with that of the bias potentiometer.

Fig. 2 shows a circuit similar to that of Fig. 1 but with a variable resistor A6 included in series between the diode A3 and the anode of the valve 5, and a variable resistor K6 included in series between the diode K3 and the cathode of the valve 5. These variable resistors may be used to produce a further control of the law of non-linearity of the impedances A and K.

By suitably adjusting the various adjustable elements provided, the diodes A3 and K3 may be caused to change state from the conductive to the non-conductive condition and vice versa over desired parts of the input range of signal amplitudes and it will be apparent that by suitable adjustment almost any desired phase-amplitude characteristic correction within a wide range of characteristics may be obtained without introducing any substantial amplitude distortion.

I claim:

A phase-amplitude characteristic correction circuit comprising a high impedance amplifier valve including an input grid, an anode circuit and a cathode return circuit, said anode circuit having a predetermined non-linear resistance-amplitude characteristic and a predetermined phase-amplitude characteristic and said cathode return circuit having a predetermined resistance-amplitude characteristic substantially similar to said anode circuit resistance-amplitude characteristic and having a substantially constant phase-amplitude characteristic, means for applying signals to be subjected to phase-amplitude correction to said input grid and means for taking phase-amplitude corrected signals from said anode circuit, wherein said anode circuit includes a capacity branch, a first resistance branch in shunt therewith and a third shunt branch including a first rectifier; and wherein said cathode return circuit includes a second resistance branch and, in shunt therewith, a branch including a second rectifier, and wherein said anode circuit and said cathode return circuit are so dimensioned that the ratio of the resistance of the anode circuit to the resistance of the cathode return circuit is substantially constant.

References Cited in the file of this patent

UNITED STATES PATENTS

| | | |
|---|---|---|
| 2,550,715 | Norton | May 1, 1951 |
| 2,602,918 | Kretzmer | July 8, 1952 |
| 2,603,708 | Anger | July 15, 1952 |
| 2,621,288 | Hings | Dec. 9, 1952 |
| 2,683,214 | Henquet et al. | July 6, 1954 |
| 2,711,494 | Westerfield | June 21, 1955 |
| 2,717,931 | Duke | Sept. 13, 1955 |
| 2,717,992 | Weintraub | Sept. 13, 1955 |

FOREIGN PATENTS

| | | |
|---|---|---|
| 201,969 | Australia | Oct. 29, 1954 |